United States Patent
Åhman

Patent Number: 6,051,054
Date of Patent: Apr. 18, 2000

[54] METHOD FOR SEPARATING DUST FROM HOT PROCESS GASES

[75] Inventor: Stefan Åhman, Växjö, Sweden

[73] Assignee: ABB Flakt AB, Stockholm, Sweden

[21] Appl. No.: 09/100,099

[22] Filed: Jun. 19, 1998

Related U.S. Application Data

[63] Continuation of application No. PCT/SE96/01454, Nov. 12, 1996, abandoned.

[30] Foreign Application Priority Data

Dec. 20, 1995 [SE] Sweden ................. 9504557

[51] Int. Cl.⁷ .................................. B01D 46/00
[52] U.S. Cl. ................. 95/273; 55/338; 55/341.1; 55/431; 55/466; 55/DIG. 25; 96/373
[58] Field of Search ............. 95/273, 278, 281; 55/466, 341.1, 338, 339, 340, 430, 431, 428, DIG. 25; 96/373

[56] References Cited

U.S. PATENT DOCUMENTS

| | | |
|---|---|---|
| 3,834,123 | 9/1974 | Margraf . |
| 3,887,343 | 6/1975 | Margraf .................. 55/430 |
| 3,897,228 | 7/1975 | Berz ......................... 55/430 |
| 4,205,931 | 6/1980 | Singer et al. ............. 55/431 |
| 4,378,976 | 4/1983 | Rush ................. 55/DIG. 25 |
| 4,579,567 | 4/1986 | Johnson ............ 55/DIG. 25 |
| 4,865,629 | 9/1989 | Zievers et al. ............ 95/273 |
| 4,874,402 | 10/1989 | Vogel ............... 55/DIG. 25 |
| 5,505,766 | 4/1996 | Chang ...................... 96/373 |
| 5,855,651 | 1/1999 | Kurita et al. ............. 55/338 |

FOREIGN PATENT DOCUMENTS

| | | |
|---|---|---|
| 3639824 | 5/1988 | Germany . |
| 3925818 | 2/1991 | Germany . |
| 195 15 352 | 11/1995 | Germany . |

*Primary Examiner*—Duane S Smith
*Attorney, Agent, or Firm*—Birch, Stewart, Kolasch & Birch, LLP

[57] ABSTRACT

A method and apparatus for separating dust from hot process gases. The process gases are passed via a gas inlet duct through a dust separator, in which dust is separated from the process gases, part of the separated dust being conducted to a device for agglomeration of the dust. Subsequently, part of the separated dust is recirculated by being introduced into the process gases in the gas inlet duct. Liquid is added to the dust in the agglomeration device in such an amount that the relative humidity in the process gases cleaned in the dust separator is higher than 30%, preferably 40–60%.

16 Claims, 2 Drawing Sheets

METHOD FOR SEPARATING DUST FROM HOT PROCESS GASES

CROSS-REFERENCE TO RELATED APPLICATIONS

This is a Continuation of International Application PCT/SE96/01454, with an international filing date of Nov. 12, 1996, now abandoned with regard to the United States of America.

SUMMARY OF THE INVENTION

The present invention relates to a method for separating dust from hot process gases, such as flue gases, in which method the process gases are conducted through a gas inlet duct to a dust separator, in which dust is separated from the process gases and from which the cleaned process gases are discharged through an outlet duct, part of the dust separated in the dust separator being passed to a device for agglomeration of the dust and then recirculated by being introduced into the process gases in the gas inlet duct.

A method of this kind is disclosed in U.S. Pat. No. 3,834,123. This document thus describes how gases containing fine particles are passed through a dust separator, in which particles are separated from the gases, and how agglomerated particles are drawn off from the dust separator and recirculated by being introduced into the gases upstream of the dust separator.

By thus recirculating agglomerated dust, the efficiency of the dust separator is increased in relation to the efficiency obtained without such recirculation.

The object of the present invention is to provide a method for separating dust from hot process gases, said method additionally improving the efficiency of the dust separator.

This object is achieved by a method in which liquid is supplied to the dust in the agglomerating device in such an amount that the relative humidity in the cleaned process gases in the outlet duct is higher than 30%, preferably 40–60%.

The invention will now be described in more detail with reference to the accompanying drawings, in which

DETAILED DESCRIPTION

Figure 1:
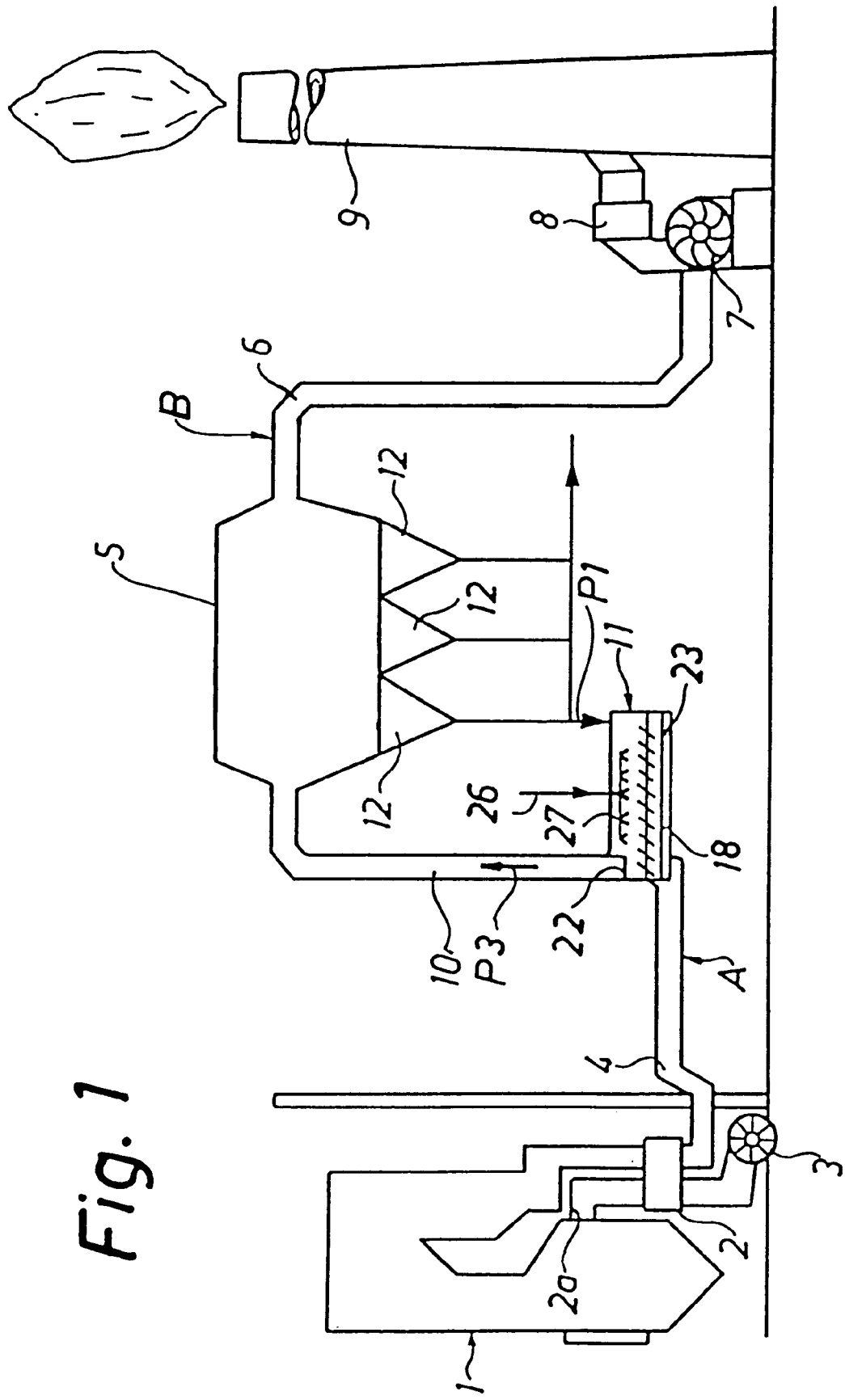
FIG. 1 is a schematic view of a plant for cleaning flue gases from a coal-fired central heating plant, the cleaning plant being provided with equipment for carrying out the method according to the invention.

FIG. 1 schematically shows a plant for cleaning flue gases from a coal-fired central heating plant 1, said flue gases containing dust, such as fly ash. A preheater 2 is arranged to transmit heat from the hot flue gases to combustion air, which is supplied through a duct 2a to the central heating plant 1 by means of a fan 3.

The hot flue gases are passed through a duct 4 to a dust separator 5, which in the shown embodiment is a fabric filter, which in known manner comprises a plurality of rows of filter bags and through which the flue gases are passed to be cleaned. The thus cleaned flue gases are passed through a duct 6 to a flue gas blower 7, which through a duct 8 feeds them to a chimney 9 to be discharged into the atmosphere. The dust separator can also be, for instance, an electrostatic precipitator.

The duct 4 comprises a vertical portion 10. A mixer 11 communicates with this portion 10 in the lower part thereof. The mixer 11 introduces in the manner that will be described in more detail below moistened and agglomerated dust particles into the flue gases in the lower part of the duct portion 10.

The dust particles separated in the dust separator 5 are collected in the hoppers 12 of the dust separator 5. Part of the collected dust particles is recirculated in the system by being passed to the mixer 11 (arrow P1). The remainder of the collected dust particles is transported away in a manner not described in detail, for instance, by means of a screw conveyor.

Figure 4:
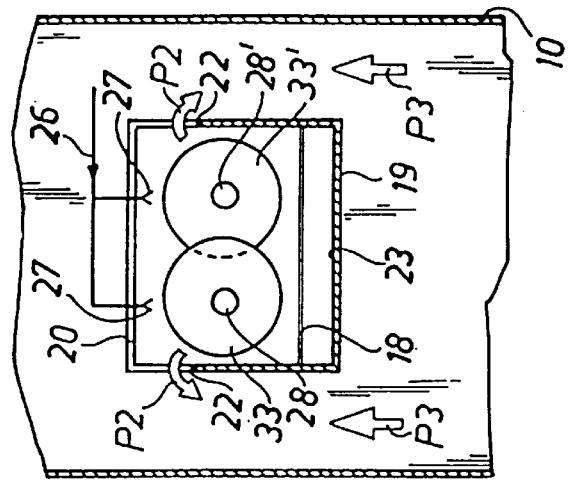
FIG. 4 is a cross-sectional view along line IV—IV in FIG. 3.
Figure 2:
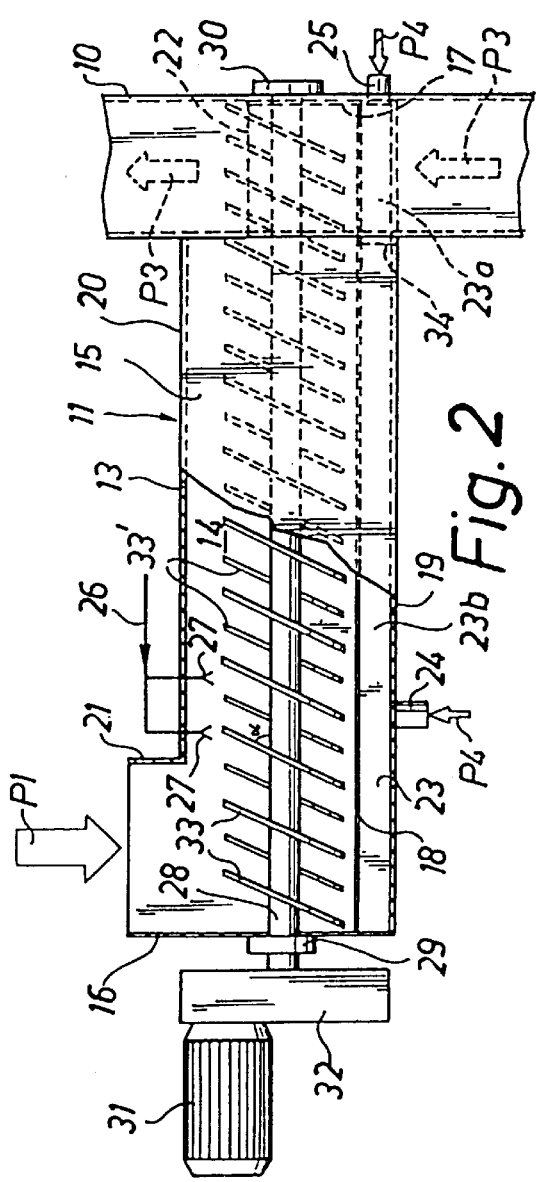
FIG. 2 is a side view in which certain parts have been broken away and which shows a mixer used for carrying out the method according to the invention.
Figure 3:
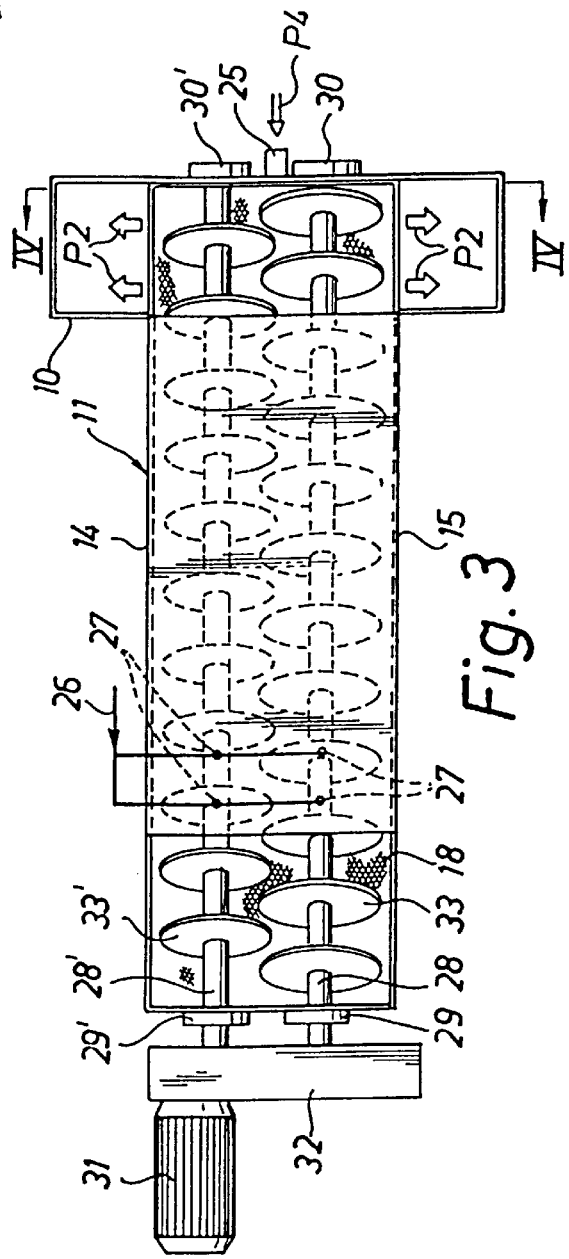
FIG. 3 shows a mixer according to FIG. 2 from above.

The mixer 11 is a mixer of the type described in WO 96/16727 and shown in more detail in FIGS. 2–4.

The mixer 11 shown in FIGS. 2–4 comprises a container 13, which essentially is in the shape of an elongate, parallelepipedal box. The container 13 has two vertical side walls 14 and 15, a vertical rear end wall 16, a vertical front end wall 17, a horizontal upper bottom 18, a horizontal lower bottom 19 and a horizontal top or lid 20.

At the rear end, the container 13 has an inlet 21, through which dust particles from the hoppers 12 are supplied from above into the container 13 (arrow P1 in FIGS. 1 and 2), and at its front end, an outlet 22, through which a homogeneous mixture of agglomerated dust particles and water is discharged (arrows P2 in FIGS. 3 and 4).

In the example shown in the drawings, the front end of the container 13 is inserted in the vertical duct portion 10, through which the flue gases are conducted upwards (arrows P3 in FIGS. 1, 2 and 4). In this application, the outlet 22 is an overflow formed as a result of the side walls 14 and 15 being lower in the part of the container 13 inserted in the duct portion 10 than in the container part located outside the duct portion 10. As appears from FIGS. 2 and 3, the top 20 extends from the inlet 21 to the outlet 22, i.e. up to the duct portion 10.

Between them, the two bottoms 18 and 19 define a chamber 23 which, in the lateral direction, is delimited by the two side walls 14 and 15 and, in the longitudinal direction, is delimited by the two end walls 16 and 17. The ceiling of the chamber 23, i.e. the upper bottom 18, consists of an air-permeable fluidization cloth of polyester mounted in stretched state in the container 13. An air-supply means, which in the embodiment shown consists of two air inlets 24 and 25, is arranged to supply air to the chamber 23 (arrows P4 in FIGS. 2 and 3), so as to fluidize the dust particles in the container 13.

A water-supply line 26, which disposed above the container 13 is connected to a plurality of nozzles 27 arranged in the upper part of the container 13 to spray water in finely-divided form over the dust particles in the container. The nozzles 27, of which but a few are shown in the drawings, are arranged in two parallel rows extending along the container 13.

Two juxtaposed horizontal shafts 28, 28' extend along the entire container 13 and are rotatably mounted in the two end walls 16 and 17 with the aid of bearings 29, 29' and 30, 30', respectively. A motor 31 is arranged to rotate the shafts 28, 28' via a transmission unit 32.

Each shaft 28, 28' supports a plurality of elliptic discs 33, 33', which, about their minor axes, are mounted in inclined state on the shafts 28, 28' at an axial distance from one another. The shafts 28, 28' extend through the centers of the respective discs 33, 33'. In the Example illustrated, each disc 33, 33' is so inclined in relation to the shaft 28, 28' that the angle α between the major axis of the disc and the shaft 28, 28' is about 60° (see FIG. 2). This angle a may vary between 45° and 80°. The discs 33, 33' are so inclined in relation to the respective shafts 28, 28' and have such an elliptic shape as to have a circular axial projection, as illustrated in FIG. 4. The discs 33, 33' are so positioned on the respective shafts 28, 28' that the discs of the one shaft project into the spaces between the discs of the other shaft.

Each of the discs 33, 33' arranged and designed in the manner indicated above performs, during the rotation of the shafts 28, 28', a throwing movement conducive to thorough mixing of the dust particles.

By a partition 34 in the front part of the container 13, the chamber 23 is divided into a front part chamber 23a, which is situated in the duct portion 10, and a rear part chamber 23b. As appears from FIG. 2, the air inlet 24 opens into the rear part chamber 23b, while the air inlet 25 opens into the front part chamber 23a. With this division of the chamber 23, it is possible to achieve different fluidisation conditions in the two part chambers 23a and 23b, especially with a view to so adapting the air supply to the front part chamber 23a that one there obtains a suitable fluidization state for the material discharge.

That part of the dust particles collected in the hoppers 12 of the dust separator 5 which is to be recirculated in the system, is supplied to the mixer 11 via the inlet 21. The dust particles are moistened with water which is supplied through the nozzles 27. By the design of the mechanical mixing mechanism and by fluidization of the dust particles supplied to the mixer, the mixer 11 produces a homogeneously moistened, homogeneous mixture of dust particles which is, via the overflow 22 of the mixer 11, continuously introduced into the duct portion 10 as agglomerated dust particles.

The function of the plant will now be described in more detail by means of five different experiments that have been carried out.

Experiment 1

The flow rate of the flue gases was 45,000 Nm³/h. At A (FIG. 1) the flue gases had a dust content of 22.5 g/Nm³ and a temperature of 130° C. The average particle size of the dust was 20 μm. The differential pressure over the fabric filter 5, which comprised 20 rows of filter bags, was constantly kept at 2,000 Pa by cleaning every row of filter bags by means of a strong compressed-air pulse, an entire cycle for cleaning all the rows of filter bags of the filter being passed in about 10 min. The interval between the pulses thus was about 30 s. The recirculation circuit comprising the mixer 11 was not used. The dust content of the flue gases at B in the duct 6 was measured to be 21.2 mg/Nm³.

Experiment 2

Like in Experiment 1, the flow rate of the flue gases was 45,000 Nm³/h. At A, the flue gases had a dust content of 19.3 g/Nm³ and a temperature of 130° C. The differential pressure over the fabric filter 5, which comprised 20 rows of filter bags, was constantly kept at 2,000 Pa by cleaning each row of filter bags by means of a strong compressed-air pulse, an entire cycle for cleaning all the rows of filter bags of the filter being passed in about 30 s. The interval between the pulses thus was about 1.5 s. Via the mixer 11, separated dust particles were recirculated in an amount of about 60 t/h. The recirculated dust particles had an average particle size of 26 μm. The dust content of the flue gases at B in the duct 6 was measured to be 35 mg/Nm³.

Experiment 3

Like in Experiments 1 and 2, the flow rate of the flue gases was 45,000 Nm³/h. At A, the flue gases had a dust content of 20.5 g/Nm³ and a temperature of 130° C. The differential pressure over the fabric filter 5, which comprised 20 rows of filter bags, was constantly kept at 2,000 Pa by cleaning each row of filter bags by means of a strong compressed-air pulse, an entire cycle for cleaning all rows of filter bags of the filter being passed in about 16 min. The interval between the pulses thus was about 48 s. Via the mixer 11, separated dust particles were recirculated in an amount of about 60 t/h. The recirculated dust particles had an average particle size of 33 μm. Water was supplied to the mixer 11 in an amount of about 1.3 m³/h, thereby cooling the flue gases to about 75° C. The dust content of the flue gases at B in the duct 6 was measured to be 15.1 mg/Nm³.

Experiment 4

Like in Experiments 1, 2 and 3, the flow rate of the flue gases was 45,000 Nm³/h. At A, the flue gases had a dust content of 20.2 g/Nm³ and a temperature of 130° C. The differential pressure over the fabric filter 5, which comprised 20 rows of filter bags, was constantly kept at 2,000 Pa by cleaning each row of filter bags by means of a strong compressed-air pulse, an entire cycle for cleaning all rows of filter bags of the filter being passed in about 28 min. Thus, the interval between the pulses was about 84 s. Via the mixer 11, separated dust particles were recirculated in an amount of about 60 t/h. The recirculated dust particles had an average particle size of 40 μm. Water was supplied to the mixer 11 in an amount of about 1.4 m³/h, thereby cooling the flue gases to about 70° C. The dust content of the flue gases at B in the duct 6 was measured to be 8.8 mg/Nm³.

Experiment 5

Like in Experiments 1, 2, 3 and 4, the flow rate of the flue gases was 45,000 Nm³/h. At A, the flue gases had a dust content of 18.5 g/Nm³ and a temperature of 130° C. The differential pressure over the fabric filter 5, which comprised 20 rows of filter bags, was constantly kept at 2,000 Pa by cleaning each row of filter bags by means of a strong compressed-air pulse, an entire cycle for cleaning all rows of filter bags of the filter being passed in about 62 min. Thus, the interval between the pulses was about 186 s. Via the mixer 11, separated dust particles were recirculated in an amount of about 60 t/h. The recirculated dust particles had an average particle size of 36 μm. Water was supplied to the mixer 11 in an amount of about 1.5 m³/h, thereby cooling the flue gases to about 65° C. The dust content of the flue gases at B in the duct 6 was measured to be 1.7 mg/Nm³.

As is evident, even without supplying water to the mixer 11, a certain agglomeration of the dust particles takes place in the mixer 11 (Experiment 2). When supplying water, an additional agglomeration of the dust particles takes place (Experiments 3, 4 and 5). The great reduction of the dust content at B in the duct 6 and, thus, of the discharge of dust into the atmosphere that was obtained in Experiments 3, 4 and 5 indicates that the increased water content of the flue gases, which in Experiments 2, 3, 4 and 5 was 4%, 30%, 38% and 51%, respectively, and the decreased temperature thereof, which in Experiments 2, 3, 4 and 5, as indicated above, was 130° C., 75° C., 70° C. and 65° C., respectively, had a great effect on the result. A high humidity in coaction with partly agglomerated dust particles has been found to give surprisingly good cleaning results.

The invention being thus described, it would be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for separating dust from hot process gases comprising the steps of:

conducting the hot process gases through a gas inlet duct to a dust separator;

separating the dust from the process gases in the separator;

discharging the cleaned process gases through an outlet duct;

passing a portion of the separated dust to a device for agglomeration;

supplying a quantity of liquid to said portion of the dust in the agglomeration device; and recirculating said portion of the dust by introducing it into the process gases in the gas inlet duct; wherein the quantity of liquid supplied is such that after said portion of the dust is introduced into the process gases, the relative humidity of the cleaned process gases in the outlet duct is greater than 30%.

2. A method for separating dust from hot process gases in accordance with claim 1, wherein the quantity of liquid supplied is such that the relative humidity of the cleaned process gases in the outlet duct is between 40% and 60%.

3. A method for separating dust from hot process gases in accordance with claim 1, wherein the agglomeration device includes a mixer, and the supplying step includes spraying said liquid over said portion of the separated dust.

4. A method for separating dust from hot process gases in accordance with claim 3, further comprising the step of stirring said portion of the separated dust so that the dust is mixed with the liquid.

5. A method for separating dust from hot process gases in accordance with claim 1, further comprising the step of stirring said portion of the separated dust so that the dust is mixed with the liquid.

6. A method for separating dust from process gases comprising the steps of:

conducting the process gases through a gas inlet duct to a dust separator;

separating the dust from the process gases in the separator, thereby creating clean process gases;

supplying a quantity of liquid to a portion of the separated dust; and introducing the fluidized dust into the process gases within the gas inlet duct; wherein the quantity of liquid supplied to said portion of the separated dust is such that after said fluidized dust is introduced into the process gases, the relative humidity of the clean process gases is brought to a value exceeding 30%.

7. A method for separating dust from process gases in accordance with claim 6, further comprising the step of stirring said portion of the separated dust so that the dust is mixed with the liquid.

8. A method for separating dust from process gases in accordance with claim 6, wherein the liquid supplying step includes the step of spraying said liquid over said portion of the separated dust.

9. A method for separating dust from process gases in accordance with claim 8, further comprising the step of providing an agglomeration device adjacent the gas inlet duct, the spraying of said liquid over said portion of the separated dust occurring within the agglomeration device.

10. A method for separating dust from process gases in accordance with claim 6, further comprising the step of discharging the cleaned process gases through an outlet duct.

11. A method for separating dust from process gases in accordance with claim 6, wherein the process gases comprise hot flue gases from a coal-fired heating plant.

12. A method for separating dust from process gases in accordance with claim 6, wherein the step of separating the dust from the process gases in the separator includes the step of collecting the dust within at least one hopper.

13. A method for separating dust from process gases in accordance with claim 10, wherein the quantity of liquid supplied is such that the relative humidity of the cleaned process gases in the outlet duct is between 40% and 60%.

14. A method for separating dust from process gases in accordance with claim 9, further comprising the step of supplying air to the agglomeration device via at least one air inlet.

15. A method for separating dust from process gases in accordance with claim 9, wherein the agglomeration device includes a mixer, the mixer having a plurality of rotating discs which bring about mixing of said portion of the separated dust and the quantity of liquid.

16. A method for separating dust from process gases in accordance with claim 10, wherein the quantity of liquid supplied is such that the relative humidity of the cleaned process gases in the outlet duct is greater than 30%.

* * * * *